United States Patent
Terlicher et al.

(10) Patent No.: US 8,535,409 B2
(45) Date of Patent: Sep. 17, 2013

(54) CONTROL METHOD FOR MELTING A METAL CHARGE AND WEIGHING DEVICE USED IN SAID METHOD

(75) Inventors: Stefano Terlicher, Cividale del Friuli (IT); Franco Scotti, Monfalcone (IT); Romano Sellan, Trieste (IT)

(73) Assignee: Danieli & C. Officine Meccaniche SpA, Buttrio (IT)

( * ) Notice: Subject to any disclaimer, the term of this patent is extended or adjusted under 35 U.S.C. 154(b) by 351 days.

(21) Appl. No.: 12/865,520

(22) PCT Filed: Jan. 30, 2009

(86) PCT No.: PCT/EP2009/051042
§ 371 (c)(1), (2), (4) Date: Jul. 30, 2010

(87) PCT Pub. No.: WO2009/095457
PCT Pub. Date: Aug. 6, 2009

(65) Prior Publication Data
US 2010/0326240 A1    Dec. 30, 2010

(30) Foreign Application Priority Data

Feb. 1, 2008  (IT) .............................. UD2008A0019

(51) Int. Cl.
*C22B 4/00* (2006.01)
*G01G 13/16* (2006.01)
*C21B 13/12* (2006.01)

(52) U.S. Cl.
USPC .................. 75/375; 75/385; 75/581; 414/21

(58) Field of Classification Search
USPC ................. 75/375, 385, 581; 414/21
See application file for complete search history.

(56) References Cited

U.S. PATENT DOCUMENTS

| | | | |
|---|---|---|---|
| 4,445,670 A | 5/1984 | Hayashi | |
| 6,004,504 A | 12/1999 | Vallomy | |

FOREIGN PATENT DOCUMENTS

| | | |
|---|---|---|
| JP | 1-174888 | 7/1989 |
| JP | 3-223134 | 10/1991 |
| JP | 8-5248 | 1/1996 |
| JP | 8-174193 | 7/1996 |
| RU | 2082763 | 6/1997 |
| WO | 03/087688 | 10/2003 |
| WO | 2005/052196 | 6/2005 |
| WO | 2006/108691 | 10/2006 |

OTHER PUBLICATIONS

Webster's Third New International Dictionary, Unabridged, Copyright © 1993 Merriam-Webster, Incorporated. Published under license from Merriam-Webster, Incorporated. Downloaded from http://lionreference.chadwyck.com/searchFulltextdo?id=9993254 &idType=offset&divLevel=2&queryld=../session/1359738525_ 17396&area=mwd&forward=refshelf&trail=refshelf on.*

(Continued)

*Primary Examiner* — George Wyszomierski
*Assistant Examiner* — Tima M McGuthry Banks
(74) *Attorney, Agent, or Firm* — Hamre, Schumann, Mueller & Larson, P.C.

(57) ABSTRACT

A control method for melting a metal charge in a furnace comprising at least a hearth containing the metal charge and a roof. The method provides that the hearth is weighed by means of a plurality of weighing elements distributed along the perimeter of the base of the hearth, and that the values detected by the plurality of weighing elements are sent to a control unit in order to obtain information relating to the distribution of the metal charge inside the hearth.

4 Claims, 2 Drawing Sheets

(56) References Cited

OTHER PUBLICATIONS

International Search Report of PCT/EP2009/051042, dated Jun. 4, 2009.

Written Opinion of the International Searching Authority issued in PCT/EP2009/051042, dated Jun. 4, 2009.

* cited by examiner

CONTROL METHOD FOR MELTING A METAL CHARGE AND WEIGHING DEVICE USED IN SAID METHOD

FIELD OF THE INVENTION

The present invention concerns a method to control the operating parameters in a melting furnace for a metal charge, using information and signals arriving from a weighing device associated with the furnace. The invention also concerns the weighing device used in the control method.

BACKGROUND OF THE INVENTION

Plants for transforming and melting metal charges are known, which comprise an electric arc furnace suitable to cooperate with a loading system, which can be of the continuous type, for example a conveyor belt, or discontinuous, for example with baskets. The electric furnace provides at least one container, or hearth, and a covering roof. The electrodes are introduced through holes present in the roof.

It is also known to use weighing systems, of the direct or indirect type, the latter being based for example on measuring the level of the liquid bath, so as to obtain information that is then used to control the operating parameters of the furnace.

For example, WO2005/052196, in the name of the present Applicant, describes a method in which the furnace is weighed periodically to detect the quantity of steel present in the furnace; in this method the temperature of the liquid bath is also monitored, substantially continuously, and the flow rate of the scrap unloaded inside the furnace is detected by weighing, and is regulated so that the temperature is kept constantly around a desired and predetermined value.

In other words, the value detected of the weight of the charge unloaded on each occasion into the furnace is used so as to regulate the speed of unloading and/or the quantity of scrap in the basket so as not to create disturbances, beyond a tolerated value, in the temperature of the liquid bath. This system is also used for keeping the quantity of liquid steel in the furnace under control.

Document JP 080005248, published on 12 Jan. 1996, also describes a method to control the melting process in an electric furnace, in which the weight of an electric furnace system and the weight of the charge introduced into the furnace are continuously detected and, according to the variations detected in said weights, the speed of feeding the charge into the furnace is adjusted.

Document RU 2082763 also describes a method to control the melting process in a furnace using signals arriving from a sensor of the weight of the scrap and from a sensor of the weight of additional materials which pass through a control unit.

Document U.S. Pat. No. 6,004,504, which provides a feed system of the continuous type and pre-heats the charge before it is introduced into the furnace, describes a method and an apparatus which use a detector of the mass of the charge and a detector of the loading speed, associated with the conveyor belt in order to control the unloading process of the charge into the furnace.

Document WO-A-03087688 describes a method for the production of molten metal in an electric furnace which provides to control at least three parameters, that is, the weight of the metal material loaded into the furnace, the volume of gas containing oxygen fed into the furnace and the quantity of electric energy fed to the furnace, in order to optimize the melting process.

WO-A-2006/108691 also deals with the problem of keeping a melting process under control, in an electric furnace with a continuous loading system, using information relating to the weight of the electric furnace system. WO'691 describes the use of rolls associated with the supporting elements of the hearth in which the weight sensors are disposed, which thus measure only the weight of the hearth and its content, and not that of the other associated equipment and/or equipment supporting the furnace.

WO'691, like WO'196, also provides that the signals relating to the weight of the hearth, after every cycle to unload the scrap, are correlated to the quantity of energy fed to the furnace to keep the temperature substantially constant and near the ideal value for the melting cycle.

In the field of transforming ferrous material into molten steel it is also known that there is a continuous search intended to guarantee increasingly high quality characteristics of the molten material, together with less wear and fewer risks of damage to parts and components, lower energy consumption with the same amount of molten metal, shorter cycle times and lower incidence of the costs of labor.

Purpose of the present invention is therefore to achieve an optimized weighing device for improving and making the measurement obtained more reliable and precise, and in this way to make the control of the melting process even more efficient, based on the information detected by said weighing device.

In this light, and based on long and thorough studies and experiments, Applicant has perfected the existing technologies, including those described in the documents described above, overcoming some disadvantages of the state of the art and achieving the present invention.

SUMMARY OF THE INVENTION

The present invention is set forth and characterized essentially in the main claims, while the dependent claims describe other innovative characteristics of the invention.

The invention concerns a method to control the melting process in an electric furnace that uses a weighing device associated with the hearth of the electric furnace.

According to one characteristic of the invention, the weighing device comprises a plurality of weighing elements, in particular load cells or other analogous or comparable weighing element, disposed around the base of the hearth in desired position and numbers, according to the weight and size of the furnace.

A preferential embodiment of the invention provides that said weighing elements are distributed substantially symmetrically, with respect to at least an axis of the furnace, along the perimeter of the base of the hearth.

According to the invention, each of said weighing elements is associated with a relative support element, solid, for example welded or anchored in some other way, with the lateral wall or the bottom of the hearth of the furnace.

A plurality of said support elements solid with the hearth are distributed along the perimeter of the bottom of the hearth and are connected to corresponding support elements, solid, for example welded or anchored in some other way, with a supporting platform with respect to which the hearth of the furnace is disposed substantially suspended.

The sensitive element of each weighing element is disposed so that, with every variation in weight of the hearth, for example deriving from the unloading of a quantity of charge, in the form of metal scrap, briquettes, sponge iron or mixtures thereof, the sensitive element is loaded under traction and records with considerable accuracy and sensitivity the value of the variation in weight.

Each sensitive element therefore works as a rod which is put under traction for a unit correlated to the variation in weight that determines the relative movement of the hearth and supporting platform.

The presence of a plurality of weighing elements suitably distributed, advantageously uniformly and/or symmetrically, around the perimeter of the base of the hearth, allows to obtain a corresponding number of values that can be compared so as to obtain information, not only on the weight of the material unloaded, but also on its distribution inside the hearth itself. In this way, it is possible to direct the unloading means so as to prevent localized accumulations and/or non optimum distribution of the material unloaded into the furnace.

One embodiment of the present invention provides that a control unit receives the information relating to the plurality of weight values detected by the individual weighing elements, processes them, and consequently conditions the unloading direction of the metal charge inside the furnace, whether it is continuous on a conveyor belt or suchlike, or discontinuous.

Furthermore, thanks to the information on the localized variations in weight, it is possible to reduce the risk of the material unloaded into the furnace knocking and damaging structural and operating elements at least partly present inside the furnace, such as electrodes, burners, lances, tuyères or other. It is also possible to prevent the metal charge from being distributed incorrectly inside the furnace, which would reduce the energy efficiency of the melting process and increase consumption and cycle times.

The weighing elements thus configured, according to another characteristic of the invention, are also self-regulating in the event of a misalignment of the base of the hearth due to non-uniform heat expansion of the hearth itself, of the supports and/or of the supporting platform.

According to a variant, the leveling of the hearth can be obtained by using tie rods associated with motorized adjustment means governed by an automatic control system.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

Figure 1:
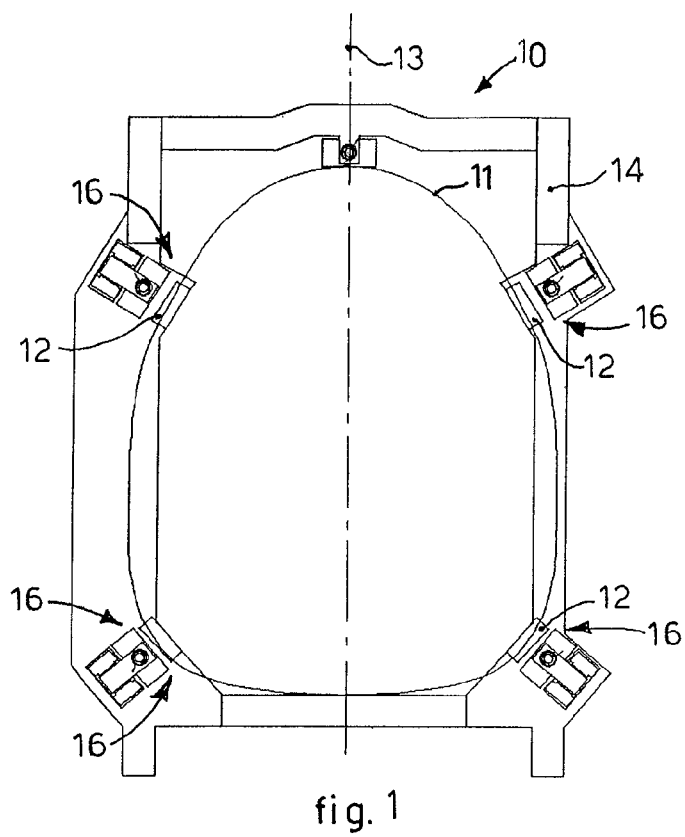
FIG. 1 is a schematic view of an electric furnace for melting a metal charge in which the present invention is applied.

With reference to FIG. 1, an electric arc furnace for melting a metal charge is denoted in its entirety by the reference number 10 and comprises, as essential elements, a hearth 11 to contain the metal charge and a covering roof, not shown in the drawings.

In a known manner, the furnace 10 is equipped with burners, oxygen lances and injectors for carbon powders and lime, able to promote the foaming of the slag, none of which is shown here.

The hearth 11 in this case is mounted on a plurality of box-like supports 12, disposed substantially vertical. In this case there are four supports 12, distributed substantially uniformly around the base of the hearth 11. In particular, the supports 12 are disposed in twos, substantially symmetrical with respect to a substantially median axis 13 of the hearth 11.

The supports 12 support the hearth 11, in substantially suspended manner, by means of anchoring brackets 20, with respect to a supporting platform 14, which also has substantially vertical supports 15 on which the brackets 20 are anchored.

With each of said supports 12 connected to the hearth 11 a relative weighing element 16 is associated, so that four weighing elements 16 are disposed in a substantially uniform manner and equally distributed around the perimeter of the hearth 11.

Figure 3:
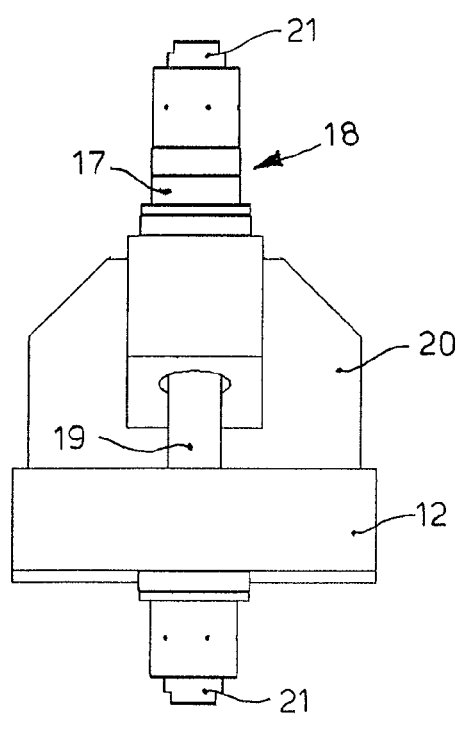
FIG. 3 shows a detail of FIG. 2.
Figure 2:
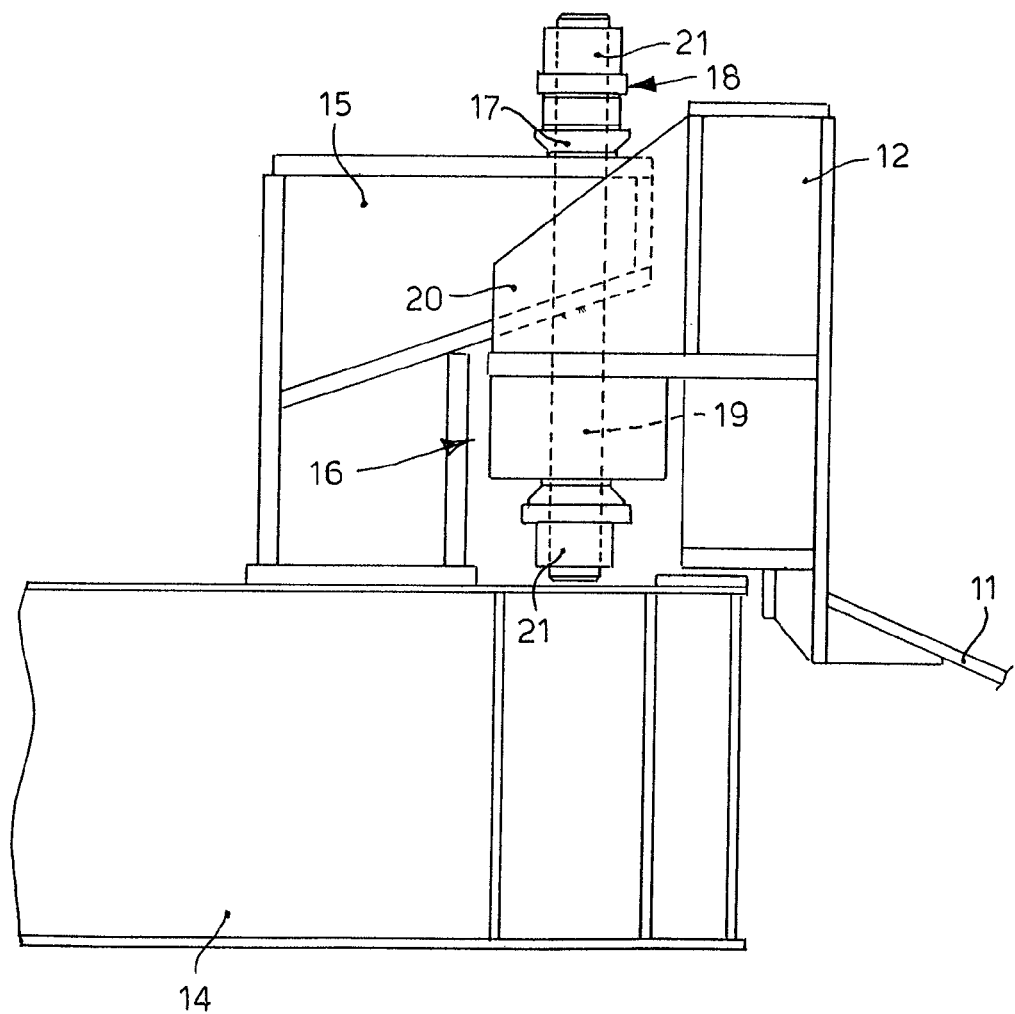
FIG. 2 shows a weighing element used in the present invention.

Each weighing element 16 has a load cell 17 (FIGS. 2 and 3) connected to a relative support 12 solid with the hearth 11 and associated with an adjustment tie rod 18, equipped with a relative rod 19 and terminal adjustment elements 21.

The adjustment tie rod 18 allows to preset a balanced value of the weight of the hearth 11 and to correct possible misalignments due to unbalanced weights, possibly detected by the individual load cells 17.

Alternatively, the tie rod 18 can also be associated with drive means (not shown) to adjust automatically and correct possible misalignments of the hearth 11.

The four load cells 17, which work under traction due to the movement of the rod 19 when stressed during the unloading steps of the metal charge, allow to detect every variation in the weight of the hearth 11, for example due to the unloading of a quantity of metal charge, in the form of scrap metal, briquettes, sponge iron or mixtures thereof.

The values of weight detected by the weighing elements 16 are sent to a command and control unit, not shown in the drawings, which processes them, relating them to their position with respect to the hearth 11, so as to obtain information relating to the distribution of the weight of the material unloaded inside the hearth 11.

Thanks to this information, the command and control unit can intervene on the unloading means, whether it is continuous or discontinuous, in order to direct the outlet and to prevent localized accumulations and/or non optimum distribution of the material unloaded inside the furnace.

In this way, it is possible to optimize the distribution of the metal charge inside the hearth 11, obtaining considerable savings in terms of energy efficiency and reduction in the cycle times, as well as a reduction in the risks of damage to elements and devices such as burners, lances, nozzles and tuyères present inside the hearth 11.

Modifications and variants may be made to the method and device as described heretofore, all of which shall come within the field of protection defined by the attached claims.

The invention claimed is:

1. A control method for melting a metal charge in a furnace comprising at least a hearth containing the metal charge and a roof, the control method comprising:

weighing the hearth with a plurality of weighing elements distributed along the perimeter of the base of the hearth, and obtaining with a control unit information relating to the weight distribution of the metal charge inside the hearth based on values sent to the control unit as detected by said plurality of weighing elements, and adjusting a leveling element associated with each of said weighing elements to level the position of the hearth according to the value of weight detected by the relative weighing element.

2. The control method as in claim 1, further comprising using said control unit to condition the direction of unloading of the metal charge inside the hearth according to the distribution of the metal charge inside the hearth.

3. The control method as in claim 1, further providing at least four of said weighing elements being distributed symmetrically with respect to at least an axis of the hearth.

4. The control method as in claim 1, further comprising automatically adjusting the position of the hearth using the values of weight detected by each of said weighing elements.

* * * * *